United States Patent [19]
Fujito et al.

[11] Patent Number: 4,611,352

[45] Date of Patent: Sep. 9, 1986

[54] OPTICAL TRANSMISSION APPARATUS

[75] Inventors: Katsuyuki Fujito; Hiroaki Nakata; Takeshige Ichida, all of Osaka, Japan

[73] Assignee: Matsushita Electric Industrial Co., Ltd., Osaka, Japan

[21] Appl. No.: 529,546

[22] Filed: Sep. 6, 1983

[30] Foreign Application Priority Data

Mar. 31, 1983 [JP] Japan ............................. 57-57578

[51] Int. Cl.⁴ ............................................. H04B 9/00
[52] U.S. Cl. ..................................... 455/609; 372/26; 372/31; 372/38; 455/613
[58] Field of Search ............... 455/608, 609, 611, 613, 455/618; 372/29, 30, 31, 32, 26, 38; 250/205

[56] References Cited

U.S. PATENT DOCUMENTS

| 4,221,960 | 9/1980 | Maeda et al. | 250/205 |
| 4,450,564 | 5/1984 | Meuleman et al. | 372/26 |

FOREIGN PATENT DOCUMENTS

| 57-4625 | 11/1982 | Japan | 455/618 |
| 2061607 | 10/1980 | United Kingdom | 372/26 |

Primary Examiner—Joseph A. Orsino, Jr.
Attorney, Agent, or Firm—Burgess, Ryan & Wayne

[57] ABSTRACT

An optical transmission apparatus is provided which has an LD of single longitudinal mode. A bias current of the LD is set at its threshold current. A current obtained by amplitude modulation of a signal to be transmitted is superposed on the bias current. The LD is then set in the multimode, so that the apparatus can transmit a high-quality signal with reduced modal noise and distortion during multimode fiber transmission.

7 Claims, 7 Drawing Figures

4,611,352

OPTICAL TRANSMISSION APPARATUS

TECHNICAL FIELD OF THE INVENTION

The present invention relates to an apparatus for performing long distance transmission of an analog signal of relatively low frequency such as a video signal without any repeating, using a laser diode (to be referred to as an LD for brevity hereinafter) as a light source and a multimode fiber, especially a graded index fiber (to be referred to as a GI fiber for brevity hereinafter). More particularly, the present invention relates to an apparatus which is capable of performing long distance transmission of a high-quality signal with stability by increasing the oscillation spectrum width of LD to suppress the modal noise by applying a sum of a current obtained by amplitude modulation of a transmission signal and a DC bias current equal to a threshold current of the so-called single longitudinal mode LD which is easy to obtain, which has a good linearity and which has a high coupling efficiency with an optical fiber.

BACKGROUND OF THE INVENTION

The present invention relates to an optical transmission apparatus which realizes an optical communication system capable of long distance transmission of a good-quality analog signal without repeating.

A light-emitting diode (to be referred to as an LED for brevity hereinafter) is conventionally used as a light source for transmitting an analog signal using an optical fiber. However, if an analog signal is to be transmitted for a long distance without repeating, the power loss is too great and available power becomes too small due to a low coupling efficiency between the LED and the optical fiber, so that satisfactory transmission may not be performed.

On the other hand, if an LD is used as a light source, a significantly high power is obtained in comparison with an LED, and long distance signal transmission is possible due to the high power of the LD and its high coupling efficiency with an optical fiber. Furthermore, recent LDs have good linearity.

When an analog signal is directly subjected to intensity modulation using an LD as a light source and the modulated signal is transmitted through a multimode fiber, satisfactory signal transmission cannot be performed due to modal noise generated by high coherency of the light source. In order to reduce the coherency of a light source, the high-frequency superposition method is generally considered to be effective. A high-frequency signal to be superposed may be a sinusoidal wave or a pulsed wave and is added to the analog signal to drive the LD. In the case of a sinusoidal wave, if a high-frequency current superposed is below a threshold current of the LD, no output light is obtained from the LD. Then, the levels of the input signal and the light output signal are no longer proportional so as to cause distortion. In the case of a pulsed wave, distortion may not be caused if the superposed current wave has an ideal rectangular shape. However, the repetition frequency of the superposed pulses is generally within the range between 100 MHz and 500 MHz, and a band width of up to about the fifth harmonic is required to apply an ideal rectangular wave. This requires incorporation of a drive circuit and an LD having a wide band width of up to 500 MHz or higher. If the upper limit of the band width is lower than this, the same problem as in the case of a sinusoidal wave is encountered, thus similarly resulting in distortion. This gives rise to degradation in the differential gain (to be referred to as DG for brevity hereinafter), and the differential phase (to be referred to as DP for brevity hereinafter) characteristics.

Moreover, a frequency range required for the drive circuit of the LD must encompass the frequency of a high-frequency signal to be superposed in addition to relatively low frequencies as in the case of a video signal band width. This results in a complex and high-cost circuit configuration. Furthermore, a circuit for compensating for the distortion component as described above is required.

SUMMARY OF THE INVENTION

It is an object of the present invention to provide an optical transmission apparatus wherein a high-frequency signal is amplitude-modulated by a video signal and the modulated signal is applied to an LD, and the bias current of the LD is set at a threshold current thereof, so that good linearity between an LD input signal and an LD light output signal is obtained, thereby eliminating distortion.

According to the optical transmission apparatus of the present invention, in order to set a bias current of the LD at a threshold current thereof, a portion of the LD output is supplied to a photoelectric transducer and an output from the photoelectric transducer is fed back to the bias current circuit of the LD so as to control the bias current of the LD.

DETAILED DESCRIPTON OF THE PREFERRED EMBODIMENTS

Figure 1:
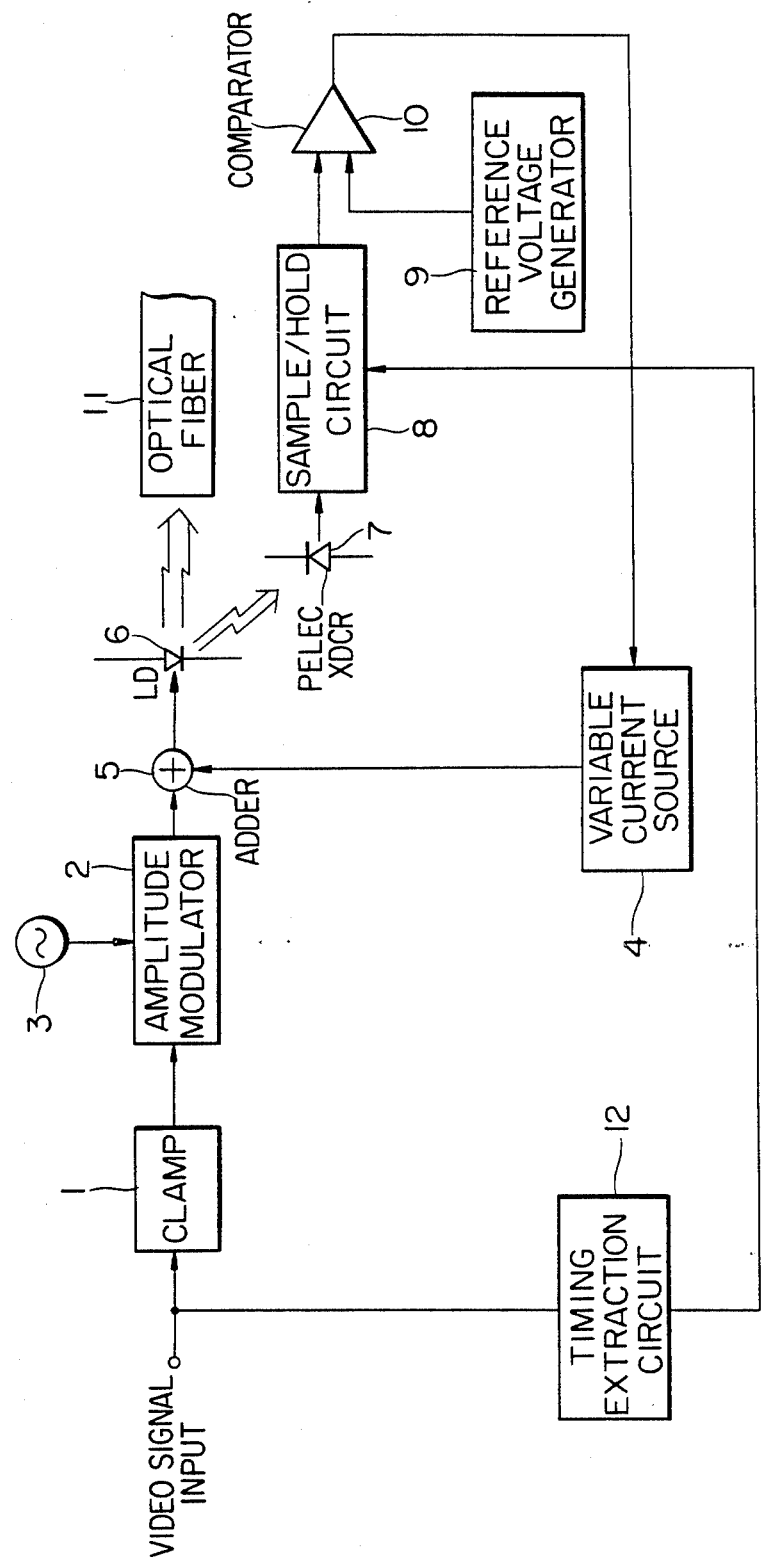
FIG. 1 is a block diagram of an optical transmission apparatus according to an embodiment of the present invention.

FIG. 1 shows the first embodiment of the present invention. A video signal input is clamped by a clamp 1 and is amplitude-modulated with a high frequency signal by an amplitude modulator 2. A high-frequency oscillator 3 is a general oscillator which oscillates within a frequency range between 100 MHz and 500 MHz or more. An AM wave output from the amplitude modulator 2 is supplied to an adder 5 which adds this input with another input from a variable current source 4 (a bias current of the LD) to be described later. An output from the adder 5 is applied to an LD 6.

According to the basic principle of the present invention, with the circuit configuration as described above, a bias current of the LD 6 is made to equal its threshold current. Then, the light output from the LD has a waveform which is obtained by subjecting an AM wave to half-wave rectification. Since the spectrum width of the LD is significantly widened, the modal noise is suppressed. When this light output from the LD is transmitted light supplied to a photoelectric transducer, an original video signal is reproduced with high precision by extracting a low frequency component of the input signal.

However, since the threshold current of the LD drifts significantly with a change in temperature, the bias current must also be changed accordingly.

The remaining portion of the circuit shown in FIG. 1 serves to vary the bias current in accordance with a change in the threshold current.

The light output from the LD 6 is guided to an optical fiber 11 and is transmitted therethrough. A portion of the light output from the LD 6 or a backward exit light output therefrom is supplied to a photoelectric transducer (PELEC XDOR) 7 such as a PIN photodetector. A specific part of the output signal from the photoelectric transducer 7 is sampled and held by a sample/hold circuit 8. An output from the sample/hold circuit 8 is supplied to a comparator 10 which also receives a reference voltage $V_R$ from a reference voltage generator 9. The comparator 10 supplies an output to the variable current source 4 so as to control an output current therefrom such that the inputs to the comparator 10 coincide with each other.

Figure 2A:
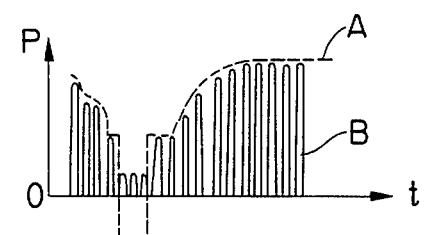
FIGS. 2A and 2B show a light output waveform and a signal waveform from a photoelectric transducer.
Figure 2B:
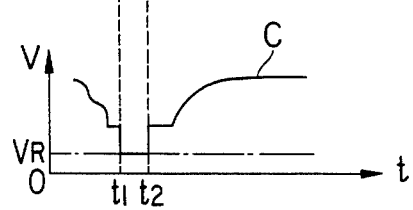

This will be explained in further detail with reference to FIGS. 2A and 2B. FIG. 2A shows a light output waveform B from the LD. Time is plotted along the axis of abscissa. Dotted curve A shows an input video signal waveform. In the circuit of the present invention, the bias current of the LD 6 is set in the vicinity of the threshold current. When the current supplied to the LD 6 is below the threshold current, the LD 6 does not emit light. When the current supplied to the LD 6 exceeds the threshold current, the LD 6 emits light. Accordingly, the obtained light output signal waveform B is a half wave rectification waveform of the AM signal as shown in FIG. 2A. When this waveform is subjected to photoelectric conversion by a photoelectric transducer and a high-frequency component is removed, a waveform C as shown in FIG. 2B is obtained.

Although a photodiode alone is illustrated as the photoelectric transducer 7 in FIG. 1, the photoelectric transducer 7 is generally considered to include an amplifier. Note that the photoelectric transducer 7 need not detect the high-frequency component which has been superposed and need only detect and amplify the DC component and the video signal component. The photoelectric transducer element of the photoelectric transducer 7 may comprise one which is used for monitoring a light output from the LD 6. The alternate long and short dashed line shown in FIG. 2B shows the reference voltage $V_R$ generated by the reference voltage generator 9. In FIGS. 2A and 2B, a case is shown in which sampling is performed for a sampling period from time $t_1$ to time $t_2$ (HD pulse). Sampling may be performed within the HD pulse duration (corresponding to the sync tip). In another case, it can be done within the pedestal duration. A timing extraction circuit 12 extracts from the video signal a pulse which determines the sampling timing of the sample/hold circuit 8. The timing extraction circuit 12 generally consists of a circuit for extracting a sync signal component from the video signal and a timing element such as a monostable multivibrator.

When sampling is performed within the sync pulse period, a sync tip voltage level of the photo-detector output signal is held. In another case, when sampling is performed within the pedestal duration, a pedestal voltage component is held. The comparator 10 feeds back a signal to the variable current source 4 such that the held voltage and the reference voltage from the reference voltage generator 9 coincide with each other and the reference voltage is adjusted such that the bias current i.e., current from the current source, coincides with the threshold current of the LD. According to this method, the response time of the system can be rendered close to the horizontal sync period, resulting in a fast response time.

The band width required for driving the LD need only be twice the band width (4 MHz to 5 MHz) of the video signal to have the carrier wave frequency as a center frequency since an AM wave is applied. If the bias current is set at the threshold current of the LD, theoretically no distortion occurs. Thus, the video input signal and the LD light output hold a complete linear relationship.

Figure 3:
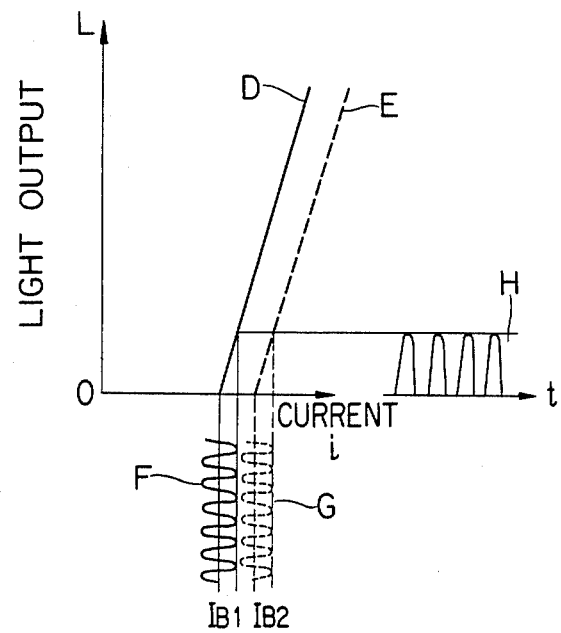
FIG. 3 is a graph showing the temperature characteristic between the light output from the LD and the LD current.

Threshold current drift of the LD due to temperature change will now be described with reference to FIG. 3. The central portion of FIG. 3 shows the i-L characteristic where current i is plotted along the axis of abscissa and light output L is plotted along the axis of ordinate. Curve D shows the i-L characteristic at temperature $T_1$ and curve E shows the same at temperature $T_2$. In the configuration that the output from the variable current source 4 is controlled such that the output from the sample/hold circuit 8 equals the reference voltage $V_R$, the light output from the LD during the sampling period is kept constant. Reference symbol H in FIG. 3 shows a light output waveform from the LD during the sampling period. In order to keep this waveform H constant, the bias current becomes $I_{B1}$ at the temperature $T_1$ and $I_{B2}$ at the temperature $T_2$. The current waveforms supplied at the temperatures $T_1$ and $T_2$ are illustrated as F and G, respectively.

When the output voltage $V_R$ from the reference voltage generator 9 is once controlled at a temperature such that the bias current coincides with the threshold current, the bias current is thereafter automatically controlled in accordance with changes in temperature.

In the configuration shown in FIG. 1, since an AM wave is used, even if the video signal input changes in any way, the average value of the LD current remains constant. Accordingly, the bias current of the LD is kept constant. The band width of the AM wave is within the carrier frequency (output frequency from the high-frequency oscillator 3)±(band width of the transmitted signal). Accordingly, even if the transmitted signal has a DC component, the adder 5 may not receive a DC component from the amplitude modulator 2, and can therefore be simplified in circuit configuration.

Figure 4:
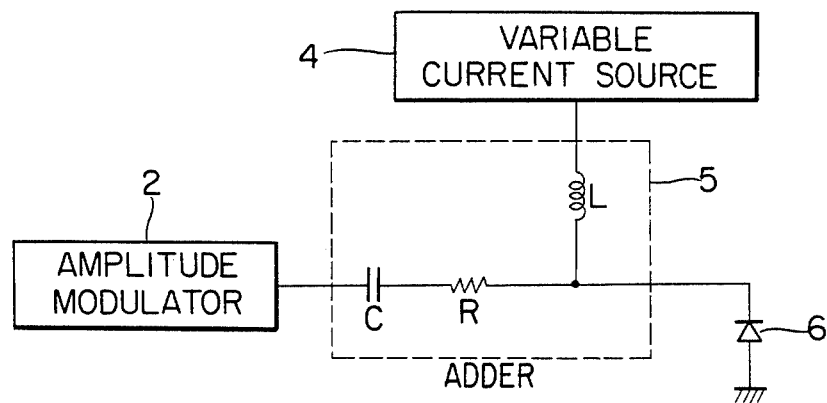
FIG. 4 shows a block diagram of a circuit section for adding together a high-frequency current and a bias current.

FIG. 4 shows an example of the adder 5. A current from the variable current source 4 for the bias current flows to the LD 6 through a high-frequency cutting coil L. The high-frequency current from the amplitude modulator 2 flows to the LD 6 through a DC blocking capacitor C and an impedance-matching resistor R. Since one input is a DC input and the other has a frequency of several hundred megahertz or higher, the inductance of the coil L and the capacitance of the capacitor C can be small.

Figure 5:
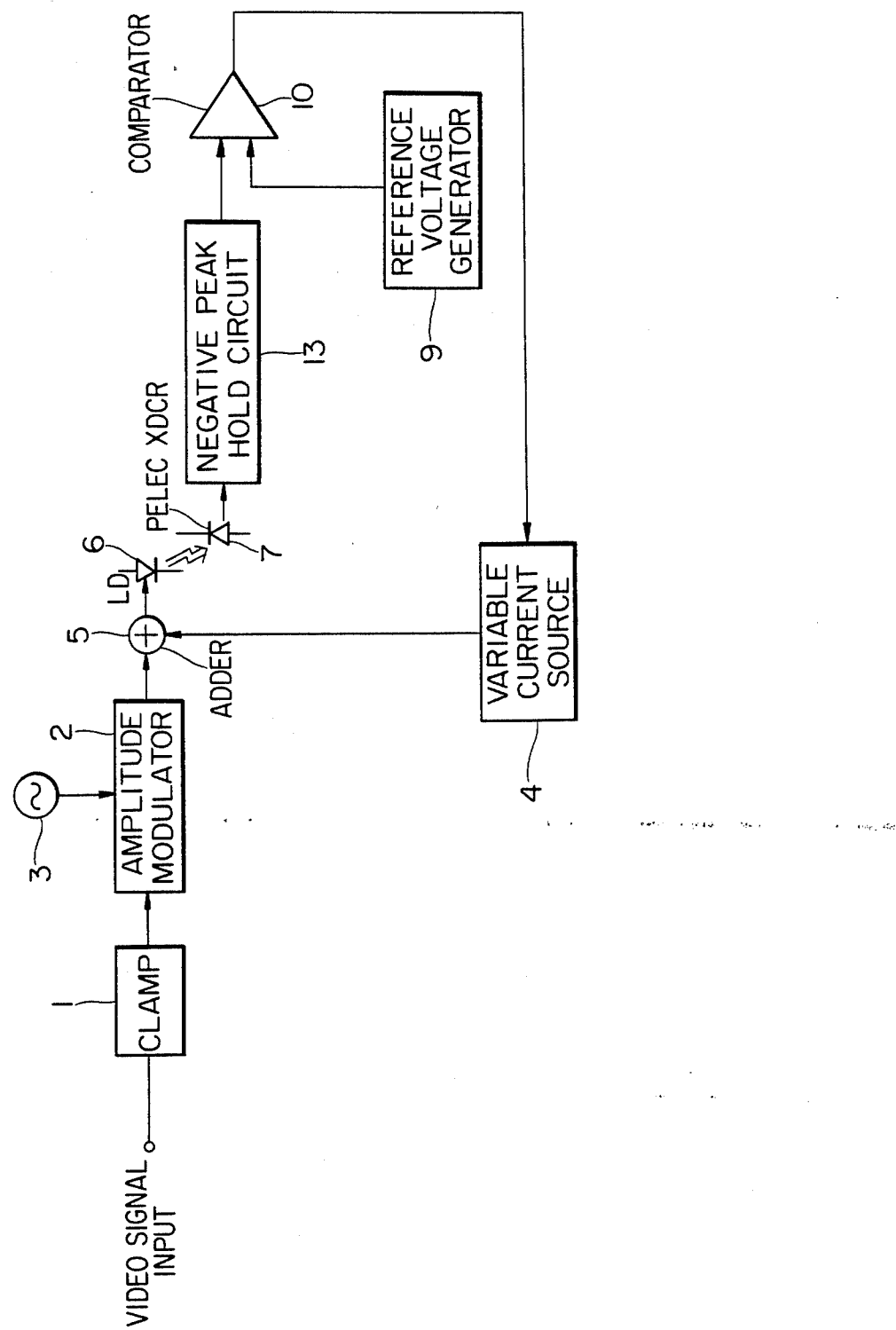
FIG. 5 is a block diagram showing another embodiment of the present invention.

FIG. 5 shows another embodiment of the present invention. Reference numerals 1 to 7, 9 and 10 denote the same parts as in FIG. 1. In this embodiment, a negative peak hold circuit 13 is used in place of the sample/hold circuit 8. The negative peak hold circuit 13 holds the value of a minimum level signal among the outputs from the photoelectric transducer 7. In this case, since the minimum level of the video signal corresponds to the sync tip, a sync tip component voltage is produced from the circuit 13. With this embodiment, no timing extraction circuit is required, and the circuit configuration of the circuit 13 is simpler than that of the sample/hold circuit 8.

In this case, a video signal input has positive polarity. However, the present invention may be similarly applied to a case of a negative video signal input. In this case, a positive peak hold circuit must be used in place of the negative peak hold circuit 13.

The frequency of the AM carrier wave will now be described. If a carrier frequency f is low, the effect of increasing the spectrum width of the LD 6 is small. Thus, the carrier frequency is preferably 100 MHz or higher. The LD output light is coupled to a pig tail fiber and is connected to a light transmission optical fiber through an optical connector. If either the fiber length L or the carrier frequency f is set so as to satisfy the relation $f=(C/2nL)\cdot(N+\frac{1}{2})$ where the distance from the LD to the end face of the first optical connector is defined as L, the refractive index of the fiber is defined as n, c is the velocity of light, and N is a positive integer, the LD is in the non-lasing state when the reflected light from this connector end face returns to the LD. Accordingly, the LD output and the reflected light to LD from the end face of the connector may not cause coherent interference, and the LD can be stably set in the multimode.

Conversely, when the relation $f=(C/2nL)\times N$ is satisfied, coherent interference occurs, and the longitudinal mode of the LD becomes extremely unstable. Then, the LD tends to cause abrupt mode change or mode hopping due to a bend in the pig tail fiber, temperature fluctuations of the LD, and changes in the bias current. Accordingly, the signal transmitted through the fiber is subject to a higher noise and a larger signal distortion.

A GI fiber is used as a transmission line. The transmission band width of the GI fiber must be wider than that of the video signal but need not encompass the carrier frequency. A receiver for receiving the signal transmitted by the apparatus of the present invention may be a conventional base band optical receiver.

Figure 6:
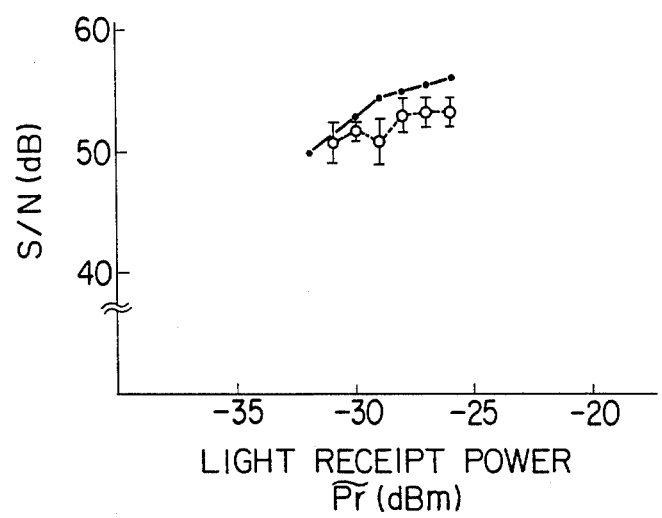
FIG. 6 is a graph showing the measurement result of the S/N ratio as a function of light reception power when the optical transmission apparatus of the present invention is used.

FIG. 6 shows the S/N ratio measurement results when signal transmission is performed through an optical fiber (GI-50/125) using the optical transmission apparatus of the present invention. In FIG. 6, repeated power is plotted along the axis of the abscissa while the S/N ratio is plotted along the axis of the ordinate. A solid dot in FIG. 6 denotes an output from a pig tail fiber (5 m), and a hollow dot denotes an output from a GI fiber (3 km). An unestimated S/N ratio of 50 dB is obtained at a reception power of −30 dBm. A light output from the pig tail fiber is −2 dBm, resulting in a transmission/reception level difference of 28 dB. Accordingly, if the fiber loss is 3 dB/km, transmission for a distance of about 9 km can be achieved. If the fiber loss is 2.5 dB/km, transmission for a distance of about 11 km can be achieved.

INDUSTRIAL APPLICABILITY

When the optical transmission apparatus of the present invention is used, an analog signal, especially a base band video signal, can be transmitted for a long distance through a GI fiber without repeating. Stable transmission of the video signal can be achieved irrespective of temperature fluctuations.

What is claimed is:

1. An optical transmission apparatus comprising:
   clamp means for clamping an input video signal;
   high-frequency oscillator means for producing a high-frequency oscillation signal;
   amplitude modulator means for modulating the high-frequency oscillation signal with the clamped video signal to produce a modulated video signal;
   light emitting means for producing an output light signal in response to said modulated video signal from said amplitude modulator means;
   variable current source means for adding a current to said modulated video signal;
   said variable current source means providing a bias current to said light emitting means for substantially linear operation of said light emitting means, said bias current being substantially equal to a threshold current to adjust the current of said modulated video signal in response to said output light signal;
   multimode optical fiber means for transmitting said output light signal from said light emitting means;
   detecting means for photoelectriclaly converting at least part of the output light signal from said light emitting means into an electric signal;
   hold circuit means for holding a part of the electric signal from said detecting means which correspond to one of a pedestal and synctip period of the video signal; and
   comparator means for comparing an output from said hold circuit with a reference voltage and producing an output signal in response thereto to control said variable current source means.

2. An apparatus according to claim 1, wherein said hold circuit means comprises a sample/hold circuit.

3. An apparatus according to claim 1, further comprising an inductance series-connected with said light emitting means and said variable current source means, and a series circuit of impedancematching resistor means and DC blocking capacitor means is connected between said light emitting means and said amplitude modulator means.

4. An apparatus according to claim 1, wherein frequency f of said high-frequency oscillator means is set to satisfy a relation:

$$f=(C/2nL)\cdot(N+\tfrac{1}{2})$$

where c is the velocity of light, n is a refractive index of said fiber means, L is a distance from said light emitting means to an end face of a first connector connected thereto, and N is a positive integer.

5. An optical transmission apparatus comprising:
   clamp means for clamping an analog input video signal;
   high-frequency oscillator means for producing a high-frequency oscillation signal;
   amplitude modulator means for modulating the high-frequency oscillation signal with the clamped video signal to produce an analog modulated video signal;

light emitting means for half-wave rectifying said analog modulated video signal and for producing an output light signal in response to a current of said modulated video signal from said amplitude modulator means which exceeds a threshold current of said light emitting means;

variable current source means for adding a current to said modulated video signal;

said variable current source means providing a bias current to said light emitting means to control the latter to operate in a substantially linear range of operation, said bias current being substantially equal to said threshold current to adjust the current of said modulated video signal in response to a DC component of said output light signal; and multimode optical fiber means for transmitting said output light signal from said light emitting means.

6. An optical transmission apparatus comprising:

clamp means for clamping an input video signal;

high-frequency oscillator means for producing a high-frequency oscillation signal;

amplitude modulator means for modulating the high-frequency oscillation signal with the clamped video signal to produce a modulated video signal;

light emitting means for producing an output light signal in response to said modulated video signal from said amplitude modulator means;

variable current source means for adding a current to said modulated video signal;

said variable current source means providing a bias current to said light emitting means for substantially linear operation of said light emitting means, said bias current being substantially equal to a threshold current to adjust the current of said modulated video signal in response to said output light signal;

multimode optical fiber means for transmitting said output light signal from said light emitting means.

7. An optical transmission apparatus comprising:

clamp means for clamping an input video signal;

high-frequency oscillator means for producing a high-frequency oscillation signal;

amplitude modulator means for modulating the high-frequency oscillation signal with the clamped video signal to produce a modulated video signal;

light emitting means for producing an output light signal in response to said modulated video signal from said amplitude modulator means;

variable current source means for adding a current to said modulated video signal;

said variable current source means providing a bias current to said light emitting means for substantially linear operation of said light emitting means, said bias current being substantially equal to a threshold current to adjust the current of said modulated video signal in response to said output light signal;

multimode optical fiber means for transmitting said output light signal from said light emitting means; and wherein a frequency f of said high-frequency oscillator means is set to satisfy a relation:

$$f = (C/nL)(N + \tfrac{1}{2})$$

where c is the velocity of light, n is a refractive index of said fiber means, L is a distance from said light emitting means to an end face of a first connector connected thereto, and N is a positive integer.

* * * * *